(12) United States Patent
Schwab

(10) Patent No.: US 6,920,493 B1
(45) Date of Patent: Jul. 19, 2005

(54) SYSTEM AND METHOD FOR COMMUNICATING COALESCED RULE PARAMETERS IN A DISTRIBUTED COMPUTING ENVIRONMENT

(75) Inventor: Stephen A. Schwab, Manhattan Beach, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 891 days.

(21) Appl. No.: 09/812,841

(22) Filed: Mar. 19, 2001

(51) Int. Cl.[7] .................................. G06F 15/173
(52) U.S. Cl. .................. 709/223; 709/225; 370/230
(58) Field of Search ................. 709/223, 225, 709/242, 232; 370/230, 236; 713/201

(56) References Cited

U.S. PATENT DOCUMENTS

| | | | | |
|---|---|---|---|---|
| 5,926,463 A | * | 7/1999 | Ahearn et al. | 370/254 |
| 5,968,176 A | * | 10/1999 | Nessett et al. | 713/201 |
| 6,041,347 A | * | 3/2000 | Harsham et al. | 709/220 |
| 6,158,008 A | * | 12/2000 | Maria et al. | 713/201 |
| 6,243,815 B1 | * | 6/2001 | Antur et al. | 713/201 |
| 6,535,883 B1 | * | 3/2003 | Lee et al. | 707/100 |
| 2002/0080784 A1 | * | 6/2002 | Krumel | 370/389 |
| 2002/0107960 A1 | * | 8/2002 | Wetherall et al. | 709/225 |

OTHER PUBLICATIONS

Calvert et al., "Building a Programmable Multiplexing Service Using Concast," Nov. 17, 2000, Proceedings, 2000 International Conference on Network Protocols, pp. 230–239.*

Calvert et al., "Concast: Design and Implementation of a New Network Service," Nov. 3, 1999, Proceedings, Seventh International Conference on Network Protocols, pp. 335–344.*

Calvert et al., "Concast: Design and Implementation of an Active Network Service," Mar., 2001, IEEE Journal on Selected Areas in Communications, vol. 19, Issue 3, pp. 426–437.*

Hazelhurst et al., "Algorithms for Improving the Dependability of Firewall and Filter Rule Lists," Jun. 28, 2000, Proceedings, International Conference on Dependable Systems and Networks, 2000, pp. 576–585.*

Calvert et al., "Internet Concast Service," Nov. 2000, Internet–Draft, University of Kentucky, from http://ftp.ist.utl.pt/pub/drafts/draft–calvert–concast–svc–00.txt, pp. 1–12 as printed.*

Calvert et al., "Internet Concast Service" Jul. 2000, Internet–Draft, University of Kentucky, from http://ftp.ist.utl.pt/pub/drafts/draft–calvert–concast–svs–00.txt, pp. 1–12 as printed.*

Dawn X. Song and Adian Perrig, *Advanced and Authenticated Marking Schemes for IP Tradeback*, report, Jun. 2000, Computer Sciences Division, University of California at Berkeley, Berkeley, California.

* cited by examiner

*Primary Examiner*—Bradley Edelman
(74) *Attorney, Agent, or Firm*—Patrick J. S. Inouye; Christopher J. Hamaty

(57) ABSTRACT

A system and a method for communicating coalesced rule parameters in a distributed computing environment are described. A plurality of packet validation devices are communicatively interposed between network routing points within the distributed computing environment. The packet validation devices apply parameterized rules to transiting network packet traffic. A plurality of processing tree nodes are configured into a concast tree. In a lowermost layer of the concast tree, each processing tree node collects and coalesces rule parameters from at least one packet validation device. In each successive layer of the concast tree, each processing tree node collects and coalesce the rule parameters from at least one processing tree node in a next lower layer of the concast tree. A control center assembles the coalesced rule parameters from each packet validation device in an uppermost layer of the concast tree. The coalesced rule parameters are forwarded from the control center to each packet validation device along a dissemination path.

28 Claims, 9 Drawing Sheets

SYSTEM AND METHOD FOR COMMUNICATING COALESCED RULE PARAMETERS IN A DISTRIBUTED COMPUTING ENVIRONMENT

FIELD OF THE INVENTION

The present invention relates in general to packet validation device communication and, in particular, to a system and method for communicating coalesced rule parameters in a distributed computing environment.

BACKGROUND OF THE INVENTION

Networks generally fall into two categories. Intranetworks include individual computers and shared resources interconnected within a shared common network domain. Internetworks consist of interconnected intranetworks and geographically distributed computational resources which, when taken as a whole, comprise a unified set of loosely associated computers. Each separate component within an internetwork has a unique address. The Internet, for example, is a public internetwork interconnecting computers worldwide.

Structurally, most networks are based on a layered model employing a stack of standardized protocol layers. The Transmission Control Protocol/Internet Protocol (TCP/IP) suite, such as described in W. R. Stevens, "TCP/IP Illustrated," Vol. 1, Ch. 1 et seq., Addison-Wesley (1994), the disclosure of which is incorporated by reference, is a widely adopted network model implementing protocol stacks including link, network, transport, and application protocol layers.

In particular, the Transmission Control Protocol (TCP) provides a connection-oriented, reliable, byte stream service. However, TCP-based networks are also particularly susceptible to denial of service ("DoS") attacks. Ordinarily, TCP servers reserve state, such as memory buffers and ports, upon receiving a service request from a client during a communication session initiation. However, a state consumption DoS attack attempts to force a victim server to needlessly allocate and waste resources used to hold per-connection state information. The attacker sends a high volume of bogus service requests to the victim server, which continues to allocate resources for per-connection state until all available resources are utilized. No additional state is left to be allocated for valid requesters and service is denied. A distributed DoS (DDoS) attack occurs when the attacker engages compromised hosts to participate in the attack by also sending bogus service requests.

DoS attacks are difficult to detect because the bogus service requests are indistinguishable from normal network traffic. One form of DoS attack employs "spoofed" packet source addresses. TCP alone does not provide means for ensuring that packet source addresses are valid. Rather, upper layer protocols must be used in conjunction with TCP to guarantee that a packet originated from the host located at the source address specified in the packet header. Attackers take advantage of this security hole by sending bogus service request packets using fraudulent source addresses to disguise their identity. The fraudulent source addresses could be the address of another system or might be a source address that is valid yet not presently in use.

In the prior art, intermediary-based packet validation devices have been employed to counter spoofed DoS attacks. These devices include conventional firewalls and proxy firewalls which are situated between a protected network domain or servers and potential attackers. In one form, these devices filter packets by applying validation rules. The source addresses of incoming packets are compared to parameterized lists of individual addresses for "bad" hosts. A "bad" host is a server which either originated a bogus service request or caused a bogus service request to be sent using a fraudulent source address.

Packet validation devices are typically deployed in two configurations. In a parallel configuration, a plurality of devices commonly protect a shared network enclave or server farm having a shared network domain. A parallel configuration could be found in, for instance, a multi-pathed server environment. A serial configuration occurs where packet validation devices are deployed at various network points, including within an intranetwork and throughout an internetwork. Serial devices do not share common network domains.

Both parallel- and serially-configured packet validation devices operate independently of each other. No communication channel interfacing the various devices exists. Consequently, while any given device may independently detect and respond to a DoS attack, the knowledge of the attack, in particular, the parameters identifying the bad host address, are not shared with other devices.

The lack of intercommunications between packet validation devices introduces additional delays in packet transfer and can adversely affect network performance. For instance, each device implements a finite amount of table space in which to list bad hosts. The table space can become saturated and the reallocation of additional space can cause delays. As well, propagation delays can occur through the serialization of sequential devices where each device checks and rechecks packet traffic against their own individual parametized lists of bad hosts. In addition, when one of the parallel devices actually validates packets originating from a given source, traffic originating from that same validated host must either undergo re-validation with the peer devices or risk being dropped as un-validated traffic.

Therefore, there is a need for an efficient communication structure for providing inter-packet validation device communications. Preferably, such an approach would coalesce validation rules received from individual devices to generate a condensed list of validation rule parameters.

There is a further need for an approach to improving the response time for handling spoofed DoS attacks. Preferably, such an approach would provide shared information between devices to avoid unnecessary delays, revalidations, and packet disposals.

SUMMARY OF THE INVENTION

The present invention provides a system and method for providing inter-packet validation device communications. A concast tree includes a plurality of hierarchically structured tree nodes through which packet validation rule parameters are received, consolidated and forwarded to a next-higher layer. Individual packet validation devices apply parameterized validation rules to validate transiting network traffic. The rule parameters are forwarded into a lowest layer of the concast tree. Duplicate rule parameters and those parameters sharing a common network Domain Name System (DNS) domain space or Internet Protocol (IP) subnet are consolidated and forwarded to the next higher layer in the concast tree. A control center receives the aggregate rule parameters and disseminates the parameters back to the individual packet validation devices for application.

An embodiment of the present invention is a system and a method for dynamically configuring parameterized validation rules in a distributed computing environment. A plurality of packet validation devices is each situated within the distributed computing environment at packet routing points. Each packet validation device validates packet traffic using parameterized validation rules. A plurality of hierarchical tree nodes are structured into a plurality of tiered layers with each tree node interfaced to at least one other tree node. Those tree nodes at a lowermost layer are further interfaced to at least one packet validation device from which validation rule parameters are retrieved and processed. A root tree node is interfaced to an uppermost layer of tree nodes from which validation rule parameters, retrieved from the root tree node, are disseminated to each of the packet validation devices.

A further embodiment is a system and a method for communicating coalesced rule parameters in a distributed computing environment. A plurality of packet validation devices is communicatively interposed between network routing points within the distributed computing environment. The packet validation devices apply parameterized rules to transiting network packet traffic. A plurality of processing tree nodes is configured into a concast tree. In a lowermost layer of the concast tree, each processing tree node collects and coalesces rule parameters from at least one packet validation device. In each successive layer of the concast tree, each processing tree node collects and coalesce the rule parameters from at least one processing tree node in a next lower layer of the concast tree. A control center assembles the coalesced rule parameters from each packet validation device in an uppermost layer of the concast tree. The coalesced rule parameters are forwarded from the control center to each packet validation device along a dissemination path.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
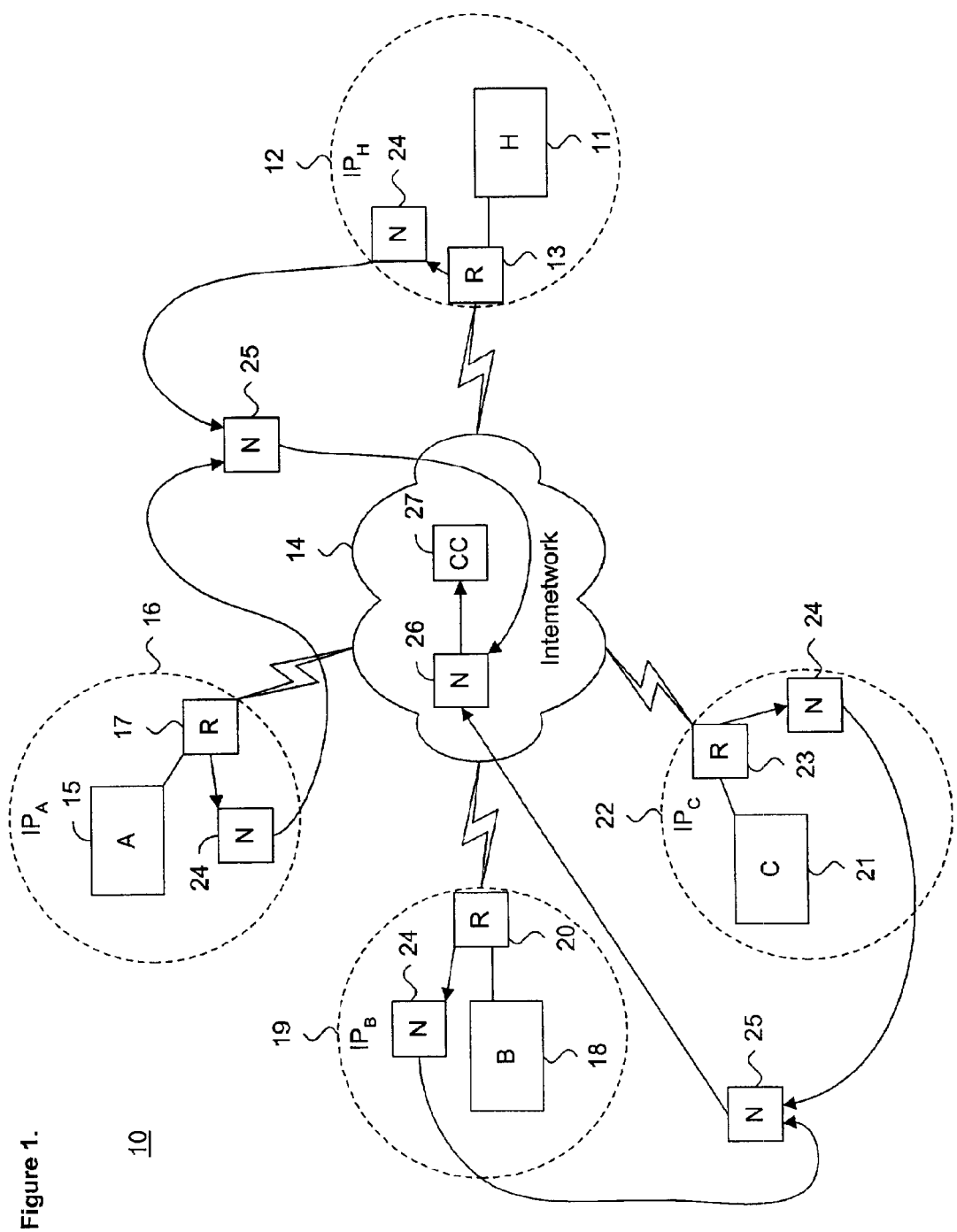
FIG. 1 is a functional block diagram showing a distributed computing environment, including a system for communicating coalesced rule parameters, in accordance with the present invention.

FIG. 1 is a functional block diagram showing a distributed computing environment 10, including a system for communicating coalesced rule parameters, in accordance with the present invention. A host server 11 operates within an internet protocol (IP) based network subdomain 12. The host server 11 is interconnected to the internetwork 14 through the network subdomain 12 via a router 13. Similarly, a plurality of remote servers, including server A 15, server B 18, and server C 21, each operate in their respective network subdomains 16, 19, 22 and are interconnected to the internetwork 14 via a router 17, 20, 23. Each individual network subdomain 12, 16, 19, 22 includes a packet validation device (not shown) incorporated within each of the respective routers 13, 17, 20, 23.

The packet validation devices apply parameterized validation rules to packet traffic flowing into and out of their respective network subdomains 12, 16, 19, 22. "Negative" validation rules disallow the forwarding of packets originating from "bad" hosts, that is, hosts within the network that have either been previously identified as passing invalid traffic, such as a bogus service request, or fraudulently addressed packets, whereas "positive" validation rules only allow the forwarding of packets originating from specifically authorized or validated" "good" hosts. In the described embodiment, the packet validation devices can apply either negative or positive validation rules.

The parameters storing the identified "bad" hosts (negative parameters) or "good" hosts (positive parameters) are forwarded to tree nodes 24 interfaced to each of the routers 13, 17, 20, 23. The tree nodes 24 constitute a lowermost layer of a hierarchically structured concast tree. The concast tree, as further described below with reference to FIG. 3, concentrates the transferal and exchange of validation rule parameters for communication between each of the other packet validation devices. The validation rule parameters are passed from the individual routers 13, 17, 20, 23 to the tree nodes 24 in the lowermost layer of the concast tree. The parameters are subsequently forwarded to tree nodes 25 in one or more intermediate layers of the concast tree and finally to a tree node 26 in the uppermost layer. Periodically, the forwarded validation rule parameters are received by a centralized control center (CC) 27 which disseminates the parameters back down to the individual packet validation devices.

As the packet validation rule parameters transit up the concast tree, the rules are coalesced into increasingly refined values which remove duplicate and commonly shared address space parameters based on the global knowledge received from other packet validation devices. Similarly, each of the packet validation devices applies a vicinity affinity filter to the coalesced packet validation parameters to limit the scope of the parameterized validation rules in use at any given time to the fewest required rules.

The individual computer systems, including servers 11, 15, 18, 21, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
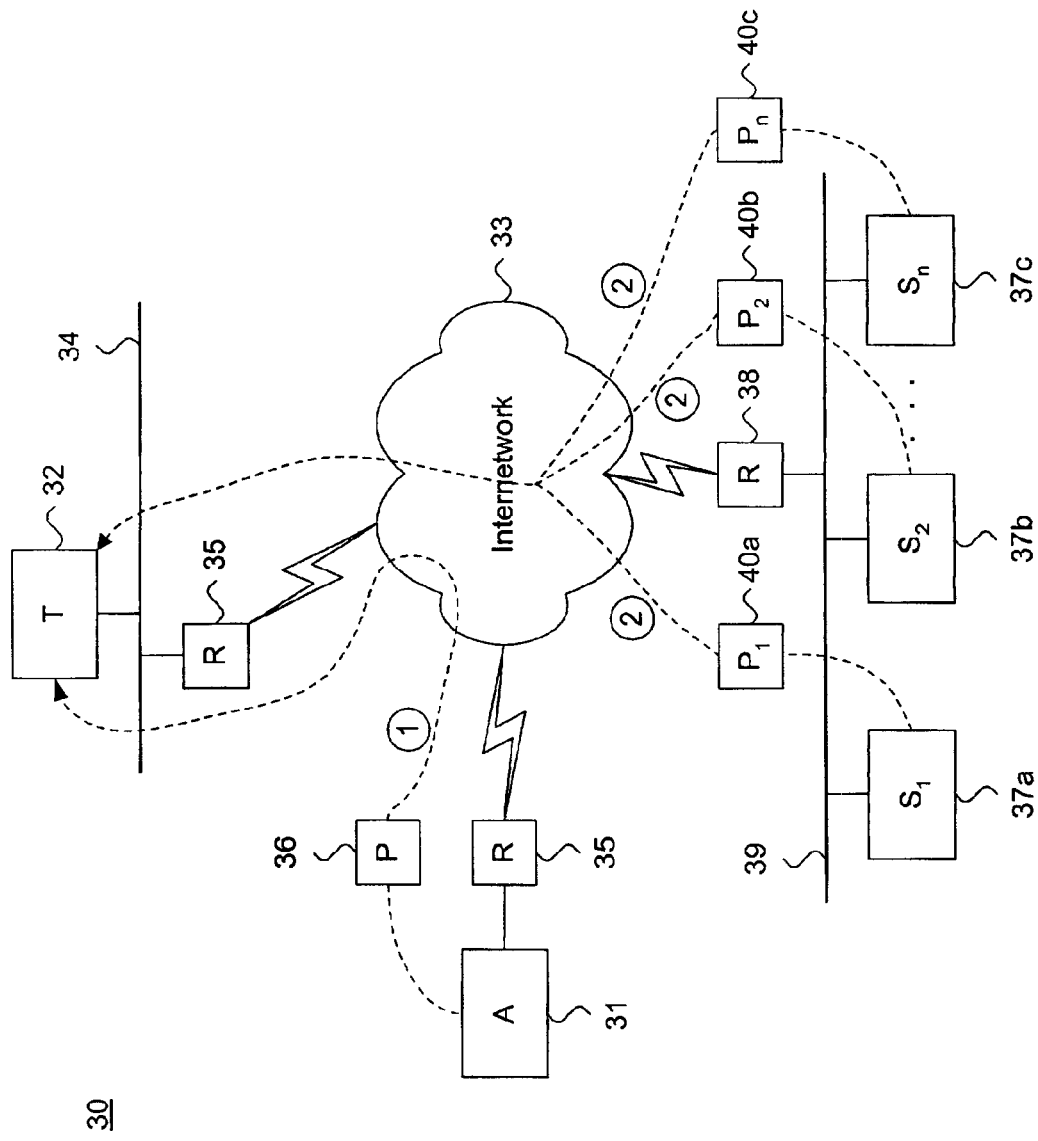
FIG. 2 is a network diagram illustrating, by way of example, the progression of a distributed denial of service attack.

FIG. 2 is a network diagram 30 illustrating, by way of example, the progression of a spoofed denial of service (DoS) attack. The goal of the spoofed DoS attack is to induce a victim server T 32 into allocating state, such as memory buffers, ports and similar limited resources, through incomplete bogus service requests. Spoofed DoS attacks usually occur in TCP/IP compliant environments, particularly with connection-oriented protocols, such as TCP.

Spoofed DoS attacks refer to the generic category of DoS attacks in which the source address of packets used in an attack are forged with either an address of another server or with an unused yet valid network address. This type of attack relies upon the inherent trust placed in network traffic. A flooding attack is a specific form of DoS attack that attempts to saturate scarce network resources by either causing traffic congestion or resource consumption. Generally, the packets used in effecting a flooding attack are spoofed.

In a single source flooding attack, an attacker 31 selects a target 32 interconnected via an internetwork 33. Often, the target 32 will be situated on a remote intranetwork 34 with the attacker 31 and remote intranetwork 34 interconnected to the internetwork 33 using routers 35 or similar connectivity devices. During the attack, the attacker 31 will send a large volume of packets 36 and attempt to cause a sufficiently high volume of packet traffic along the path leading to the target 32 (step ①). Eventually, either the link to the target 32 will become congested and saturated with traffic or the target 32 will exhaust substantially all available resources, at which point a denial of service is achieved.

Alternatively, the attacker 31 could enlist the assistance of compromised or "stooged" hosts 37a, 37b, 37c in a multi-source flooding attack. Typically, the compromised hosts 37a, 37b, 37c are interconnected via an intranetwork 39 in turn interconnected to the internetwork 33 via a router 38 or similar connectivity device. During a flooding DoS attack, the attacker 31 coordinates the transmittal of spoofed packets 40a, 40b, 40c from the compromised hosts 37a, 37b, 37c which collectively converge on the target 32 (step ②). As before, either the link to the target 32 eventually becomes congested and saturated with spoofed packet traffic, or the target 32 allocates substantially all available state, thereby achieving a denial of service.

Figure 3:
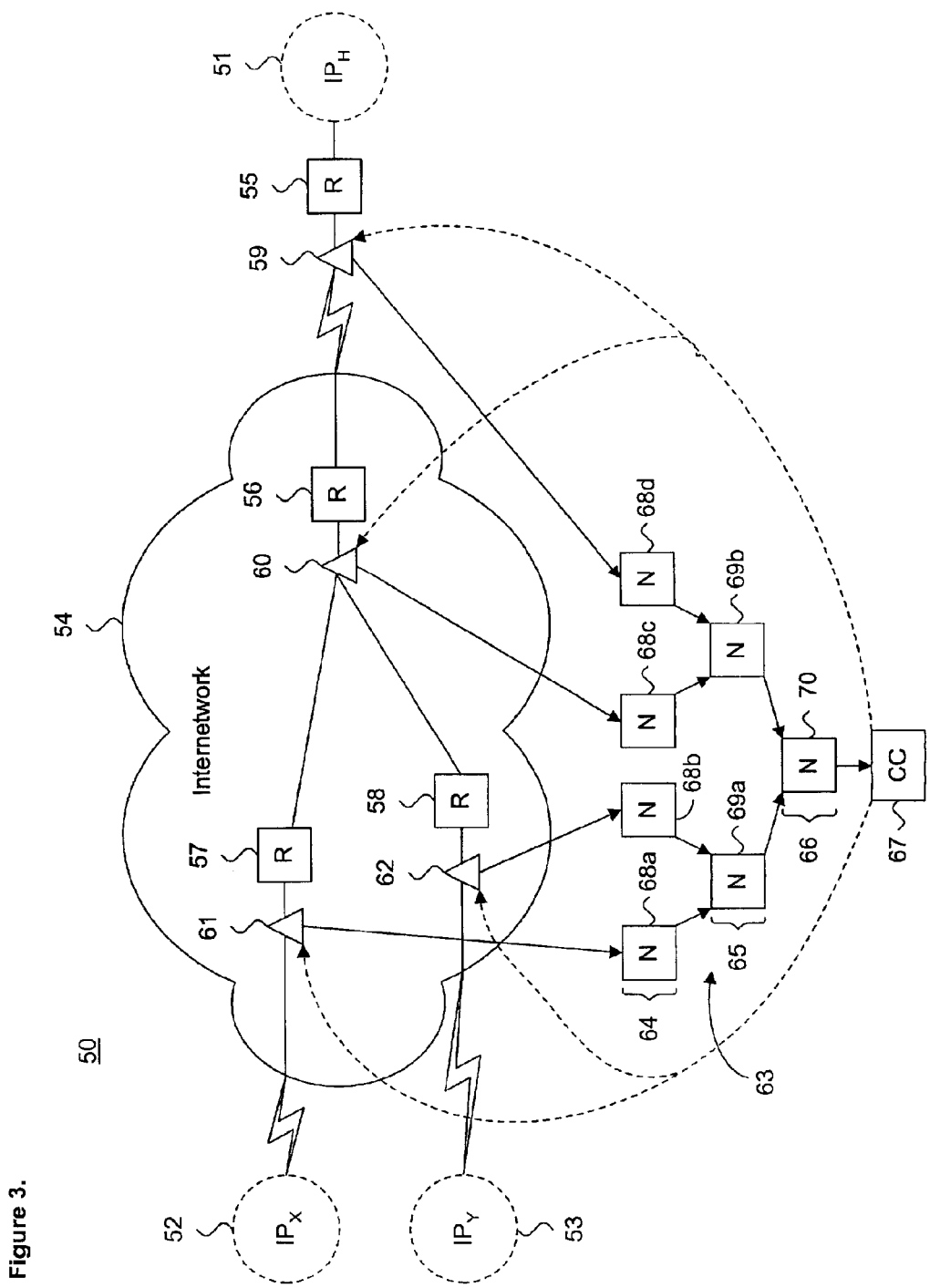
FIG. 3 is a block diagram showing the system for communicating coalesced rule parameters of FIG. 1.

FIG. 3 is a block diagram showing the system for communicating coalesced rule parameters 50 of FIG. 1. The system 50 includes three primary groups of components: packet validation devices 59–62, a concast tree 63, and a control center (CC) 67. These components cooperatively exchange rule parameters on a continuing basis, as further described below beginning with reference to FIG. 7.

Each component is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The components operate in accordance with a sequence of process steps, as further described below beginning with reference to FIG. 7.

In an ordinary non-attack state, a plurality of network subdomains $IP_H$ 51, $IP_X$ 52, $IP_Y$ 53 are interconnected via an intranetwork 54. Each of the network subdomains $IP_H$ 51, $IP_X$ 52, $IP_Y$ 53 are either individual servers or hosts or intranetworks connecting multiple servers, hosts and clients, or some combination thereof In addition, each of the network subdomains $IP_H$ 51, $IP_X$ 52, $IP_Y$ 53 are interconnected to the internetwork 54 via a router 55 or similar connectivity device (shown only for subdomain $IP_H$ 51). Internally, the internetwork 54 includes multiple routers 56, 57, 58 for internally routing packet traffic. For simplicity, ancillary network support components, such as intermediate hosts, gateways and the like have been omitted. In the described embodiment, the internetwork 54 is an IP-compliant network and packet traffic is internally routed using the border gateway protocol or similar form of dynamic routing protocol, such as described in W. R. Stephens, "TCP/IP Illustrated, Vol. 1," Ch. 10, Addison Wesley Publishing Co. (1994), the disclosure of which is incorporated by reference.

The individual routers 55–58 are paired with a packet validation device 59–62. Alternatively, each of the routers 55–58 could implement the packet validation rule sets as part of their functionality. Each of the packet validation devices 59–62 applies parameterized packet validation rules to packet traffic transiting through the associated router 55–58. Preferably, each packet validation device 59–62 is situated at a packet routing point within the internetwork 54. The parameterized packet validation rules either exclude those packets originating from either a known attacker or a network address that has not been validated (negative validation rules) or include only those packets originating from a validated host (positive validation rules).

The packet validation devices 59–62 operate independently of each other, , H but communicate to an associated node 68a–d in a lowermost layer 64 of the concast tree 63. Upon the non-validation of a packet, the rule parameters are forwarded to the associated node 68a–d.

The concast tree 63 can have an arbitrary number of layers. However, those nodes 68a–d in the lowermost layer 64 of the concast tree 63 function as the origination point of coalesced rule parameters received from packet validation devices 59–62. The received rule parameters are collected and coalesced by the interior node 69a–b in the intermediate layers 65 of the concast tree 63. The interior nodes 69a–b remove duplicate rule parameters and consolidate commonly-identified network address space to successively refine the sets of rule parameters traveling upwards in the concast tree 63.

The concast tree 63 includes a root node 70 in an uppermost layer 66. The root node 70 collects all of the forwarded rule parameters into a single centralized point. The root node 70 periodically forwards the consolidated rule parameters to a control center (CC) 67, possibly incorporated into part of the concast tree 63. The control center 67 disseminates the rule parameters to the individual packet validation devices 59–62.

The communication of the rule parameters upwards through the concast tree 63 and downwards to the packet validation devices 59–62 is logically separable. The concast tree 63 is a hierarchical structure requiring the rule parameters to travel from the lowermost layer 64 to the uppermost layer 66 via the interior layers 65. The interior nodes 69a–b coalesce the forwarded rule parameters, as further described below with reference to FIGS. 4 and 5. The dissemination of coalesced rule parameters from the control center 67 to the packet validation devices 59–62 need not travel along the same path and can occur directly between the control center 67 and each device.

Structurally, the communication to, from and between the nodes comprising the concast tree 63 can occur via in-band or out-of-band communications, or via some combination thereof An in-band communications channel could be formed, by way of example, by reserving bandwidth within the internetwork 54 for communicating between the various nodes. An out-of-band communications channel could be formed using interconnections peripheral to the internetwork 54. Similarly, the dissemination of rule parameters from the control center 67 to the packet validation devices 59–62 could also occur via in-band or out-of-band communications, including via a Global Satellite Broadcast channel, or via some combination thereof.

Figure 4:
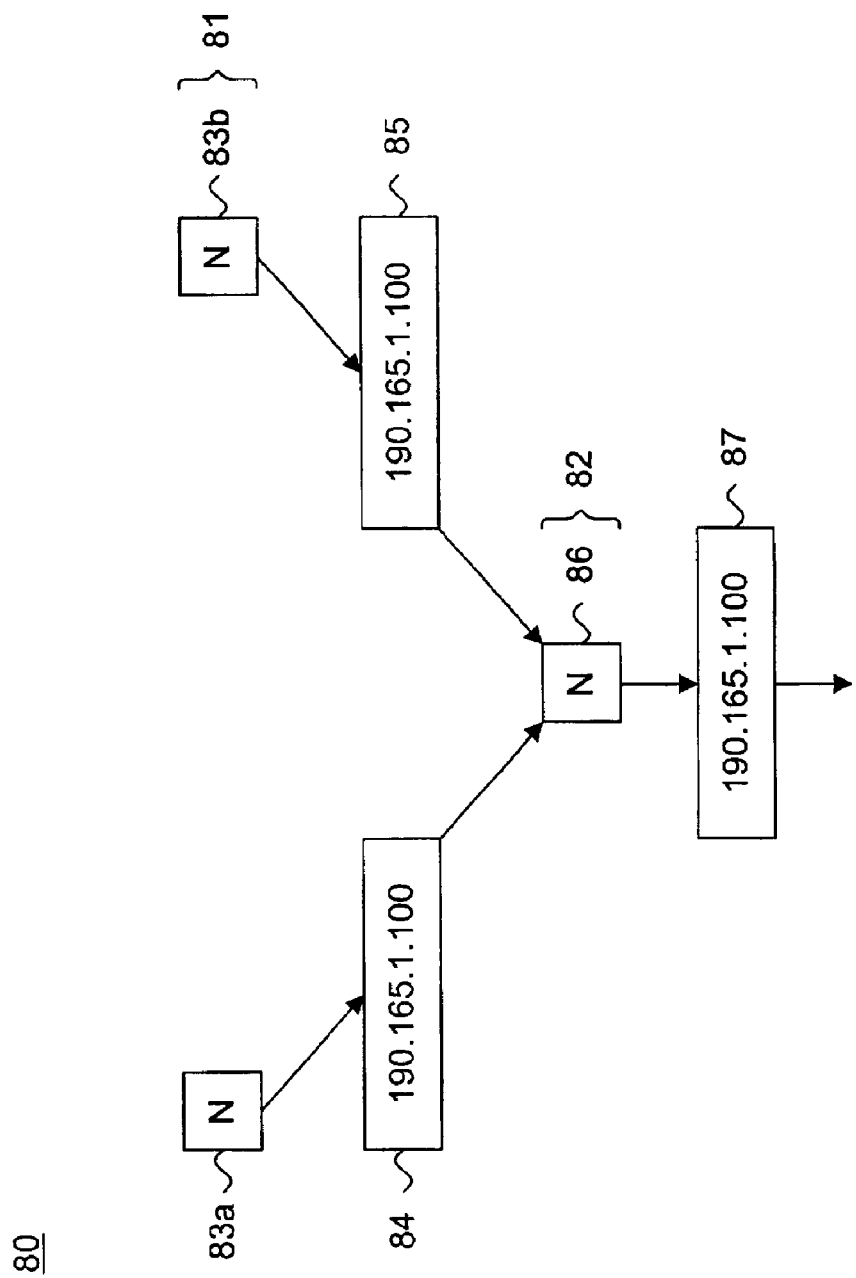
FIG. 4 is a tree diagram showing, by way of example, the removal of duplicate rule parameters.

FIG. 4 is a tree diagram showing, by way of example, the removal of duplicate rule parameters. A set of peer nodes 83a, 83b in an intermediate layer 81 of a concast tree 80 both forward a set of rule parameters 84, 85 containing a network address of 190.165.1.100. Each of these address sets 84, 85 have been respectively received from different packet validation devices 59–62 (shown in FIG. 3). However, by implication, the source address 190.165.1.100 is from a "bad" host that was non-validated by at least the two packet validation devices 59–62. Upon receiving the rule parameters 84, 85, a parent node 86 in the next higher layer 82 of the concast tree 80 removes the duplicate rule parameters and forwards a single rule parameter 87 containing the identified network address 190.165.1.100.

Figure 5:
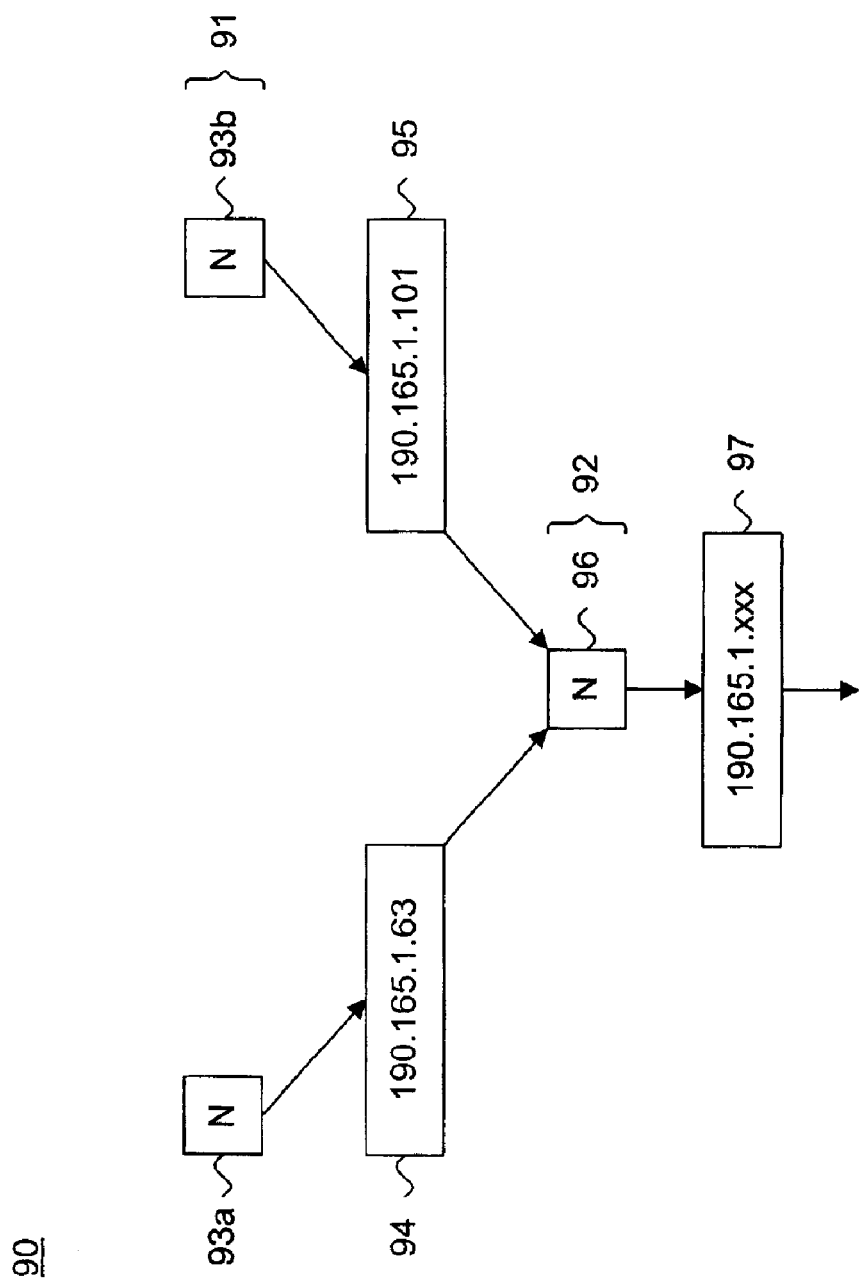
FIG. 5 is a tree diagram showing, by way of example, the coalescing of network address space.

FIG. 5 is a tree diagram showing, by way of example, the coalescing of rule parameters. A set of peer nodes 93a, 93b in intermediate layer 91 of a concast tree 90 forward a set of rule parameters 94, 95 respectively containing the network addresses 190.165.1.63 and 190.165.1.101. By implication, these rule parameters indicate that at least two of the packet validation devices 59–62 have non-validated packets received from separate "bad" hosts having a "source" address of 190.165.1.63 and 190.165.1.101. The parent node 96 in the next intermediate layer 92 of the concast tree 90 coalesces these rule parameters 94, 95 into a commonly identified network address space 190.165.1.XXX, thereby causing a non-validation of all packets originating from a commonly shared network address domain 97. In the described embodiment, rule parameters are coalesced upon the occurrence of at least four separately-identified network address spaces, although as few as two can suffice in some network environments.

By way of example, two aggregation heuristics can be applied to the rule parameters to determine a commonly identified network address space. First, expansive aggregation applies a netmask that covers the largest possible network address space. For example, a netmask of 255.255.255.240 is the most expansive unifier. Applying this netmask to rule parameter 94 would result in a network address space of 190.165.1.48 and to rule parameter 95 would result in a network address space of 190.165.1.96.

Alternatively, negative aggregation applies a netmask that most limits the network address space. For example, a netmask of 255.255.255.160 is aggregate of 190.165.1.48⊕190.165.1.96 and is therefore the most restrictive unifier. Applying this netmask to rule parameter 94 or to rule parameter 95 in both cases would result in a network address space of 190.165.1.32. Other aggregation heuristics are possible, as would be recognized by one skilled in the art.

Figure 6:
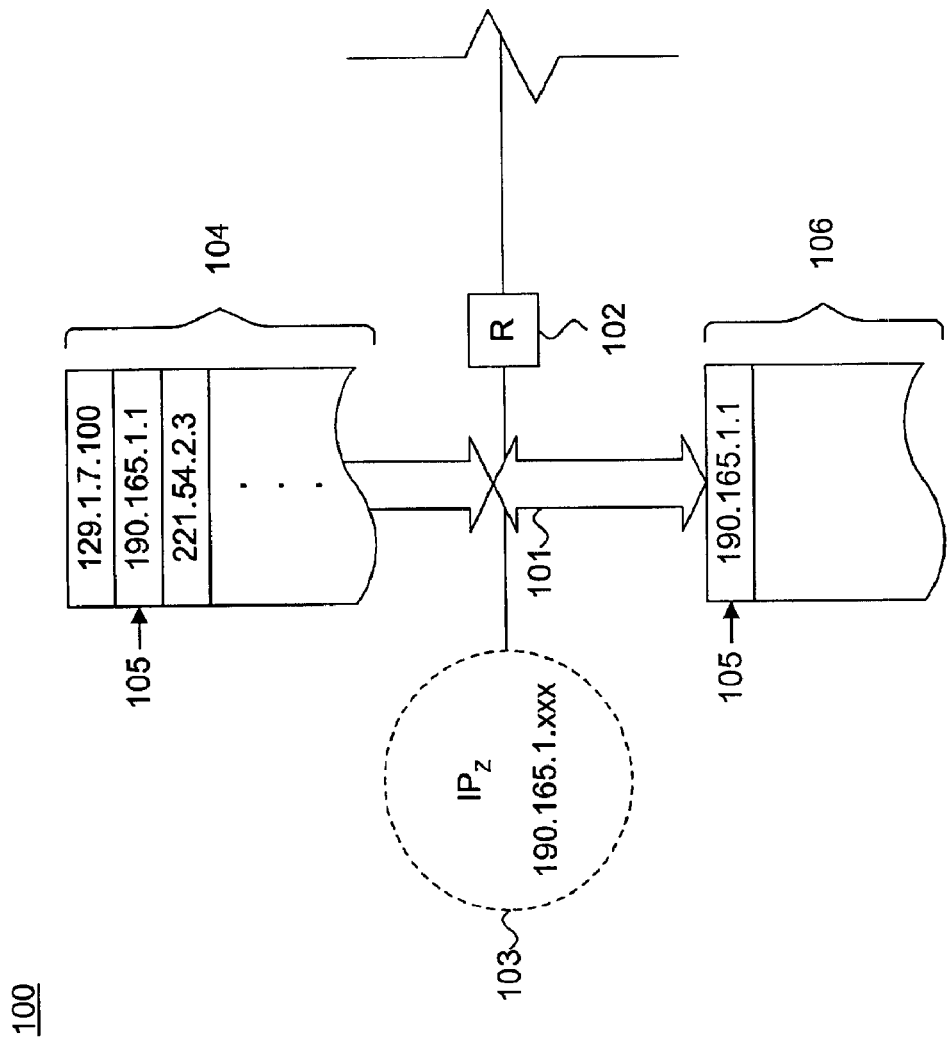
FIG. 6 is a block diagram showing, by way of example, the application of a vicinity affinity filter.

FIG. 6 is a block diagram showing, by way of example, the application of a vicinity affinity filter 100. The vicinity affinity filter 100 is applied by each individual packet validation device 59–62 (shown in FIG. 3) to limit the application of the coalesced rule parameters 104 received from the control center 67 (shown in FIG. 3). Depending upon the location of the packet validation device 59–62 within the internetwork 54, certain packet validation devices 59–62 validate network traffic from a limited address space within the internetwork 54.

For example, a packet validation device 101 operating in conjunction with a router 102 in support of a network subdomain 103 having a network address space of 190.165.1.XXX need not consider rule parameters falling outside of that domain for outgoing packets. Thus, a rule parameter 105 specifying a domain address of 190.165.1.1 would be extracted from a set of coalesced rule parameters 104 into an abbreviated rule parameter set 106 containing just the rule parameter 105 for the network address 190.165.1.1. In the described embodiment, the vicinity affinity filter 100 is applied for those network domains 103 falling within three "hops" of the packet validation device 101, although link paths having other lengths are also feasible.

Figure 7:
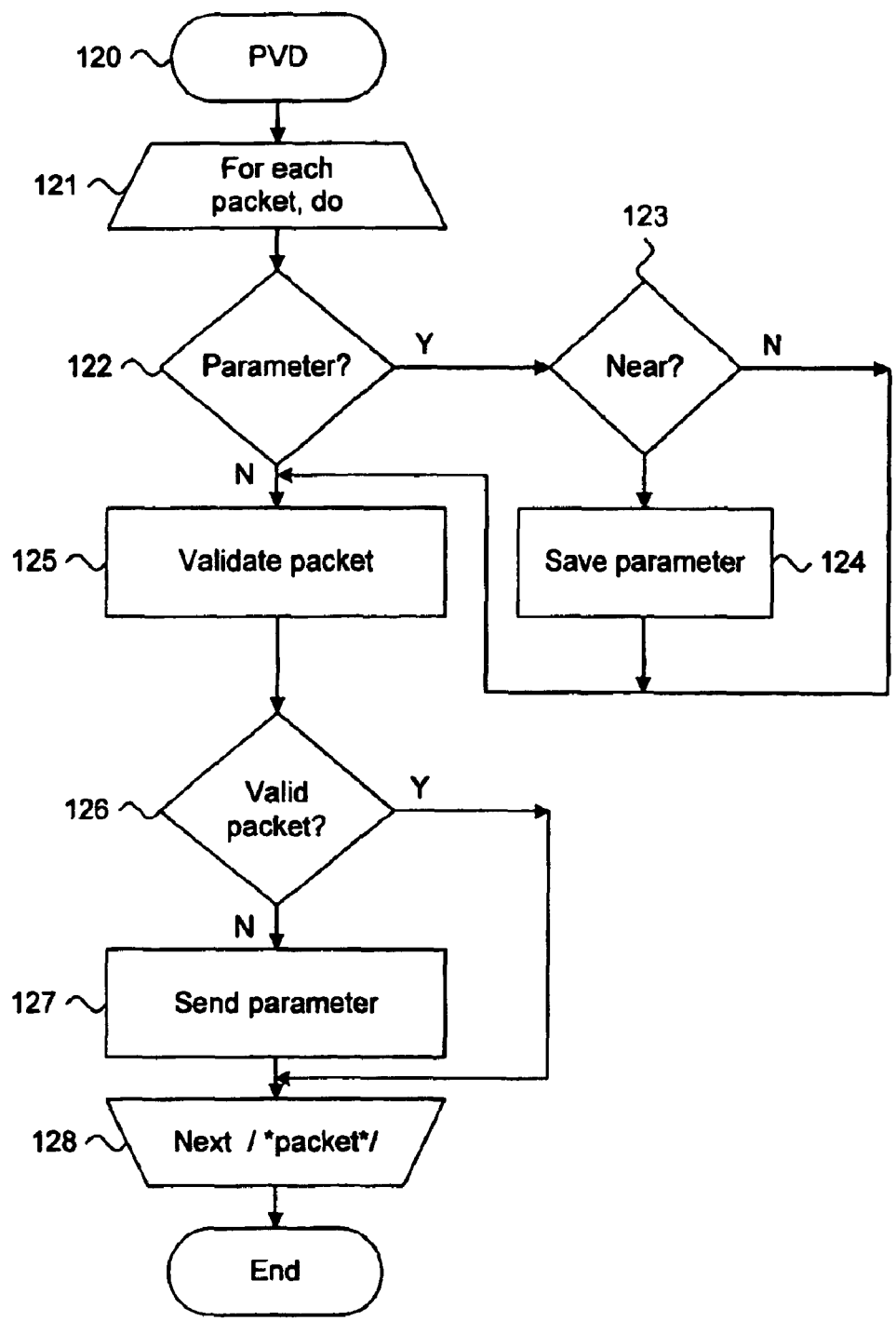
FIG. 7 is a flow diagram showing a method for communicating coalesced rule parameters for an individual packet validation device in accordance with the present invention.

FIG. 7 is a flow diagram showing a method 120 for communicating coalesced rule parameters for an individual packet validation device 59–62 in accordance with the present invention. The purpose of the method 120 is to forward rule parameters from the packet validation device 59–62 (shown in FIG. 3) to the nodes 68a–b in the lowermost layer 64 of the concast tree 63. For simplicity, the actual validation of packets is omitted from discussion and outside the subject matter of the present invention. An approach to validating packets using negative packet validation rules is described in D. X. Song et al., "Advanced and Authenticated Marking Schemes for IP Traceback," Tech. Rep. No. UCB/CSD-00-1107, Univ. of Cal. (June 2000), the disclosure of which is incorporated by reference.

Transiting network packets are processed in an iterative loop (blocks 121–127) as follows. First, if the packet contains rule parameters (block 123) and, by application of the vicinity affinity filter 100 (shown in FIG. 6), the parameters are within the network domain of the packet validation device (block 123), the rule parameters are saved and applied to future packets transiting the packet validation device (block 124). Otherwise, if the packet does not contain a set of rule parameters (block 122), the packet is validated (block 125). If the packet is not validated by application of a parameterized validation rule (block 126), the rule parameter is sent (block 127) to the associated node 68a–d in the lowermost layer 64 of the concast tree 63. Processing continues for each subsequent packet (block 128), after which processing terminates.

Figure 8:
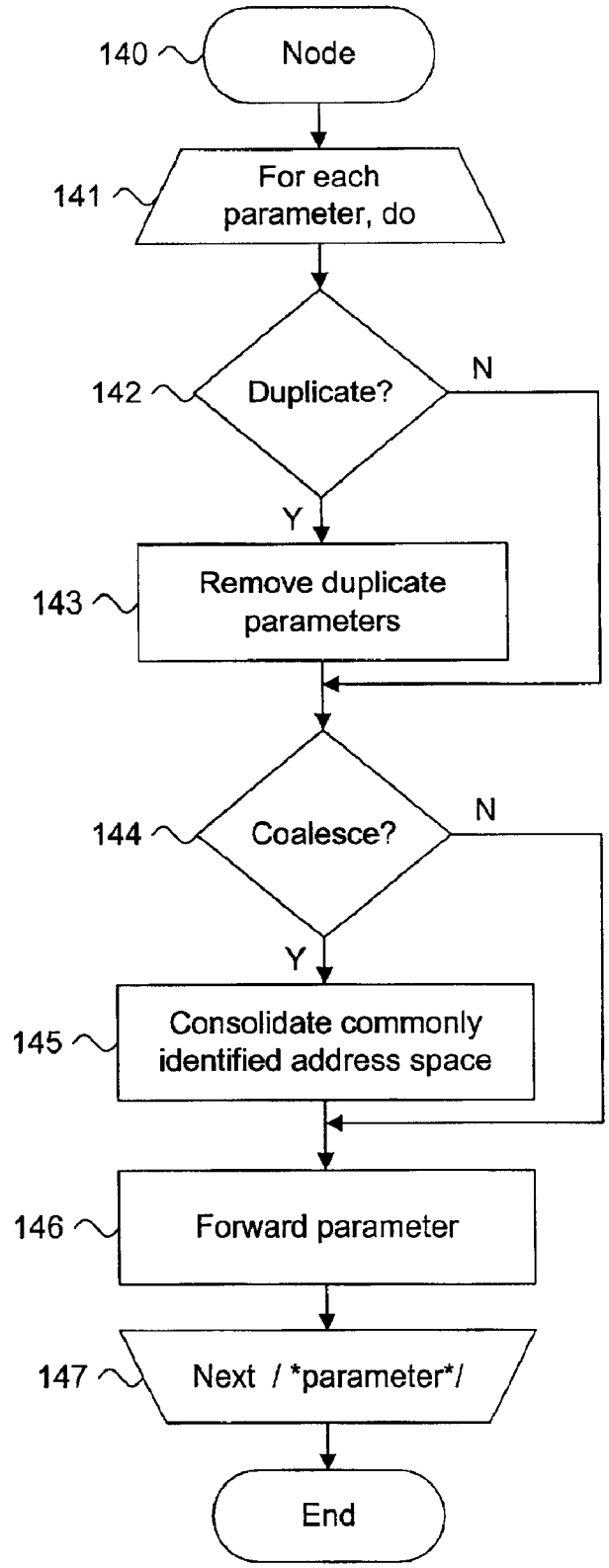
FIG. 8 is a flow diagram showing a method for communicating coalesced rule parameters for a node in a concast tree in accordance with the present invention.

FIG. 8 is a flow diagram showing a method 140 for communicating coalesced rule parameters for a node in a concast tree in accordance with the present invention. The purpose of the method 140 is to process rule parameters received from either a packet validation device 59–62 (shown in FIG. 3) or a child node from the next lower layer in the concast tree 63. Rule parameters are processed in an iterative loop (block 141–147) as follows. First, if the rule parameters are duplicated (block 142), the duplicate rule parameters are removed (block 143) and only a unique occurrence is forwarded to the next layer in the concast tree 63. Next, the rule parameters are coalesced (block 144) to consolidate any commonly identified address spaces (block 145) shared by two or more of the rule parameters. The consolidated rule parameter is forwarded to the next higher layer in the concast tree 63 or, if the node is the root node 70, to the control center 67 (block 146). Processing of each successive rule parameter set continues (block 147) until all sets have been processed, after which the routine terminates.

Figure 9:
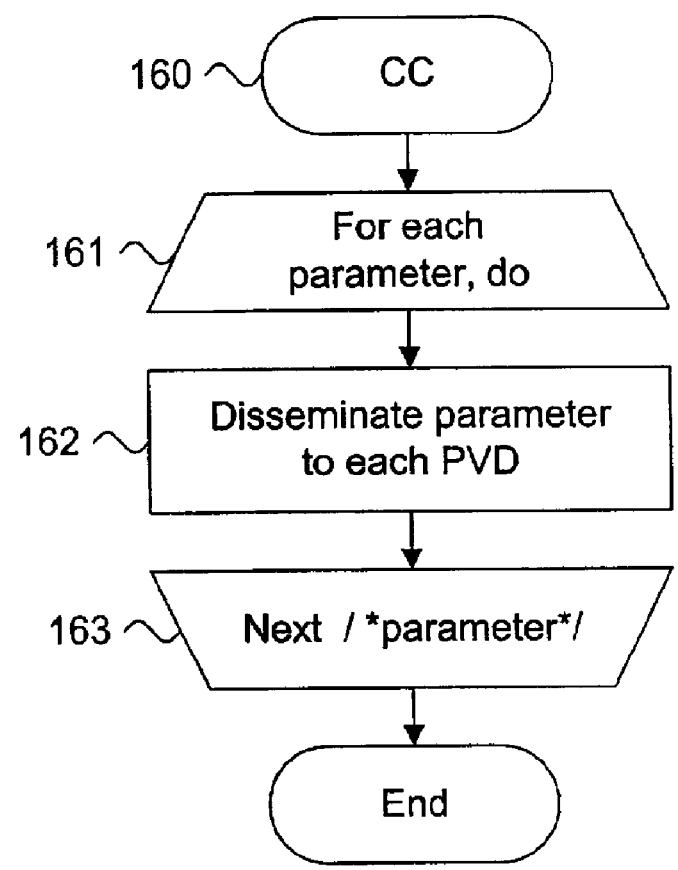
FIG. 9 is a flow diagram showing a method for communicating coalesced rule parameters for a control center in accordance with the present invention.

FIG. 9 is a flow diagram showing a method 160 for communicating coalesced rule parameters for a control center in accordance with the present invention. The purpose of the method 160 is to forward consolidated rule parameters to the individual packet validation devices 59–62 (shown in FIG. 3). The dissemination of the rule parameters is performed in an iterative loop (blocks 161–163) during each iteration of which the consolidated packet validation rules are disseminated to the individual packet validation devices 59–62 (block 162). Iterative processing continues for each of the rule parameters (block 163), after which the routine terminates.

While the invention has been particularly shown and described as referenced to the embodiments thereof, those skilled in the art will understand that the foregoing and other changes in form and detail may be made therein without departing from the spirit and scope of the invention.

What is claimed is:

1. A system for dynamically configuring parameterized validation rules in a distributed computing environment, comprising:
   a plurality of packet validation devices, each situated within the distributed computing environment at packet routing points and validating packet traffic using parameterized validation rules;
   a plurality of hierarchical tree nodes structured into a plurality of tiered layers with each tree node interfaced to at least one other tree node, those tree nodes at a lowermost layer further interfaced to at least one packet validation device from which validation rule parameters are retrieved and processed;
   a root tree node interfaced to an uppermost layer of tree nodes from which validation rule parameters are retrieved and disseminated to each of the packet validation devices; and
   a filter executed by each tree node on retrieved validation rule parameters to remove at least one of duplicate validation rule parameters and validation rule parameters sharing commonly identified network address space.

2. A system according to claim 1, further comprising:
   a concast tree interconnecting the packet validation devices, the tree nodes, and the root tree node via an interconnection reserved for validation rule parameter exchange.

3. A system according to claim 1, further comprising:
   a dissemination path interconnecting the root tree node with each packet validation device via an interconnection reserved for validation rule parameter exchange.

4. A system according to claim 1, wherein the validation rule parameters each comprise a source network address and subnet mask, a source network port, a destination network address and subnet mask, a destination network port, and one or more network protocol identifiers.

5. A method for dynamically configuring parameterized validation rules in a distributed computing environment, comprising:
   fielding a plurality of packet validation devices, each situated within the distributed computing environment at packet routing points and validating packet traffic using parameterized validation rules;
   interconnecting a plurality of hierarchical tree nodes structured into a plurality of tiered layers with each tree node interfaced to at least one other tree node, those tree nodes at a lowermost layer further interfaced to at least one packet validation device from which validation rule parameters are retrieved and processed;
   interfacing a root tree node to an uppermost layer of tree nodes from which validation rule parameters are retrieved and disseminated to each of the packet validation devices; and
   executing a filter by each tree node on retrieved validation rule parameters to remove at least one of duplicate validation rule parameters and validation rule parameters sharing commonly identified network address space.

6. A method according to claim 5, further comprising:
   interconnecting a tree between the packet validation devices, the tree nodes, and the root tree node via an interconnection reserved for validation rule parameter exchange.

7. A method according to claim 5, further comprising:
   interconnecting a dissemination path between the root tree node and each packet validation device via an interconnection reserved for validation rule parameter exchange.

8. A method according to claim 5, wherein the validation rule parameters each comprise a source network address and subnet mask, a source network port, a destination network address and subnet mask, a destination network port, and one or more network protocol identifiers.

9. A computer-readable storage medium holding code for performing the method of claim 5.

10. A system for communicating coalesced rule parameters in a distributed computing environment, comprising:
    a plurality of packet validation devices communicatively interposed between network routing points within the distributed computing environment and applying parameterized rules to transiting network packet traffic;
    a plurality of processing tree nodes configured into a concast tree, comprising:
       in a lowermost layer of the concast tree, each processing tree node collecting and coalescing rule parameters from at least one packet validation device; and
       in each successive layer of the concast tree, each processing tree node collecting and coalescing the rule parameters from at least one processing tree node in a next lower layer of the concast tree;
    a control center assembling the coalesced rule parameters from each packet validation device in an uppermost layer of the concast tree; and
    a dissemination path forwarding the coalesced rule parameters from the control center to each packet validation device.

11. A system according to claim 10, wherein each processing tree node further comprises:
    a parameter filter removing duplicate rule parameters and consolidating commonly identified network address space.

12. A system according to claim 10, wherein each packet validation device further comprises:
    a rule filter limiting application of the coalesced rule parameters to those network routing points within a pre-determined vicinity.

13. A system according to claim 10, wherein the dissemination path further comprises:
    the distributed computing environment through which the coalesced rule parameters are broadcast to each packet validation device.

14. A system according to claim 10, wherein the dissemination path further comprises:
    the concast tree through which the coalesced rule parameters are sent to each packet validation device via the processing tree nodes.

15. A system according to claim 10, wherein the concast tree farther comprises:
   an in-band communication channel logically defined via bandwidth reserved within the distributed computing environment.

16. A system according to claim 10, wherein the concast tree further comprises:
   an out-of-band communication channel interfacing the packet validation devices, the processing tree nodes, and the control center via interconnections peripheral to the distributed computing environment.

17. A system according to claim 10, wherein the rule parameters each comprise:
   source packet information describing a source network address and subnet mask;
   source port information describing a source network port;
   destination packet information describing a destination network address and subnet mask;
   destination port information describing a destination network port; and
   network protocol information identifying one or more network protocols.

18. A system according to claim 10, wherein the distributed computing environment comprises an internet-protocol (IP)-based network.

19. A method for communicating coalesced rule parameters in a distributed computing environment, comprising:
   applying parameterized rules to network packet traffic transiting a plurality of packet validation devices communicatively interposed between network routing points within the distributed computing environment;
   configuring a plurality of processing tree nodes into a concast tree, comprising:
      collecting and coalescing rule parameters from at least one packet validation device into a processing tree node in a lowermost layer of the concast tree; and
      collecting and coalescing the rule parameters from at least one processing tree node in a next lower layer of the concast tree in each successive layer of the concast tree;
   assembling the coalesced rule parameters from each packet validation device in an uppermost layer of the concast tree into a control center and forwarding the assembled coalesced rule parameters to each packet validation device.

20. A method according to claim 19, further comprising:
   removing duplicate rule parameters and consolidating commonly identified network address space.

21. A method according to claim 19, further comprising limiting application of the coalesced rule parameters to those network routing points within a pre-determined vicinity.

22. A method according to claim 19, further comprising:
   broadcasting the assembled coalesced rule parameters through the distributed computing environment to each packet validation device.

23. A method according to claim 19, further comprising:
   sending the assembled coalesced rule parameters to each packet validation device through the concast tree via the processing tree nodes.

24. A method according to claim 19, further comprising:
   logically defining an in-band communication channel by reserving bandwidth within the distributed computing environment.

25. A method according to claim 19, wherein the concast tree further comprises:
   interfacing the packet validation devices, the processing tree nodes, and the control center via an out-of-band communication channel using interconnections peripheral to the distributed computing environment.

26. A method according to claim 19, wherein the rule parameters each comprise:
   source packet information describing a source network address and subnet mask;
   source port information describing a source network port;
   destination packet information describing a destination network address and subnet mask;
   destination port information describing a destination network port; and
   network protocol information identifying one or more network protocols.

27. A method according to claim 19, wherein the distributed computing environment comprises an internet-protocol (IP)-based network.

28. A computer-readable storage medium holding code for performing the method of claim 19.

* * * * *

UNITED STATES PATENT AND TRADEMARK OFFICE
CERTIFICATE OF CORRECTION

| | | |
|---|---|---|
| PATENT NO. | : 6,920,493 B1 | Page 1 of 1 |
| APPLICATION NO. | : 09/812841 | |
| DATED | : July 19, 2005 | |
| INVENTOR(S) | : Schwab | |

It is certified that error appears in the above-identified patent and that said Letters Patent is hereby corrected as shown below:

In the claims:
col. 11, line 2, change "farther" to --further--.

Signed and Sealed this
Eighteenth Day of January, 2011

David J. Kappos
*Director of the United States Patent and Trademark Office*